(12) United States Patent
DeCusatis et al.

(10) Patent No.: US 7,839,777 B2
(45) Date of Patent: Nov. 23, 2010

(54) METHOD, SYSTEM, AND APPARATUS FOR ACCELERATING RESOLUTION OF NETWORK CONGESTION

(75) Inventors: Casimer DeCusatis, Poughkeepsie, NY (US); Thomas A. Gregg, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 482 days.

(21) Appl. No.: 11/862,370

(22) Filed: Sep. 27, 2007

(65) Prior Publication Data
US 2009/0086637 A1    Apr. 2, 2009

(51) Int. Cl.
*G01R 31/08* (2006.01)
*H04L 1/12* (2006.01)
*G06F 11/00* (2006.01)

(52) U.S. Cl. .................. 370/230; 370/235; 370/242; 370/249; 709/232

(58) Field of Classification Search ......... 370/229–238, 370/351, 389–401; 709/223–225, 231–244; 455/445, 450–453
See application file for complete search history.

(56) References Cited

U.S. PATENT DOCUMENTS

| | | | |
|---|---|---|---|
| 5,361,259 A | 11/1994 | Hunt et al. | |
| 5,781,532 A * | 7/1998 | Watt | 370/236 |
| 6,418,119 B1 | 7/2002 | Hatta et al. | |
| 6,426,944 B1 | 7/2002 | Moore | |
| 6,741,555 B1 * | 5/2004 | Li et al. | 370/229 |
| 7,016,971 B1 * | 3/2006 | Recio et al. | 709/233 |
| 2005/0144309 A1 | 6/2005 | Gish | |
| 2007/0268830 A1 * | 11/2007 | Li et al. | 370/235 |
| 2008/0025217 A1 * | 1/2008 | Gusat et al. | 370/232 |
| 2008/0259959 A1 * | 10/2008 | Zhai | 370/474 |
| 2009/0059916 A1 | 3/2009 | DeCusatis et al. | |
| 2009/0080334 A1 | 3/2009 | DeCusatis et al. | |

OTHER PUBLICATIONS

Proposal for Traffic Differentiation in Ethernet Networks, [online]; [retrieved on Sep. 20, 2007], retrieved from the Internet, http://www.ieee802.0rg/l/files/public/docs2005/new-wadekar-virtual%20-links-0305.pdf.

* cited by examiner

*Primary Examiner*—Tri H Phan
(74) *Attorney, Agent, or Firm*—Cantor Colburn LLP; Steven Chiu

(57) ABSTRACT

The response time for resolving network traffic congestion is accelerated in a Data Center Ethernet (DCE) network. A data packet is received at a node in the network. Congestion of the data packet at the node is detected, and a backward congestion notification signal for the data packet is generated. A packet injection rate is adapted based on at least one of the backward congestion notification signal generated by the node and another backward congestion notification signal.

15 Claims, 4 Drawing Sheets

METHOD, SYSTEM, AND APPARATUS FOR ACCELERATING RESOLUTION OF NETWORK CONGESTION

BACKGROUND

The present invention relates generally to network congestion, and, more particularly, to resolving network congestion.

Data Center Ethernet (DCE) is an emerging industry standard which proposes modification is to existing networks, in an effort to position Ethernet as the preferred convergence fabric or all types of data center traffic. A recent study has found that Ethernet is the convergence fabric, with I/O consolidation in a Data Center as shown in FIG. 1. This consolidation is expected to simplify platform architecture and reduce overall platform costs. More details of proposals for consolidation are described in "Proposal for Traffic Differentiation in Ethernet Networks," which may be found at http://www.ieee802.org/1/files/public/docs2005/new-wadekar-virtual%20-links-0305.pdf.

Major changes have been proposed for DCE (also referred to as enhanced Ethernet and low latency Ethernet), including the addition of credit based flow control at the link layer, congestion detection and data rate throttling, and the addition of virtual lanes with quality of service differentiation. It is important to note that these functions do not affect Transmission Control Protocol/Internet Protocol (TCP/IP), which exists above the DCE level. It should also be noted that DCE is intended to operate without necessitating the overhead of TCP/IP. This offers a much simpler, low cost approach that does not require offload processing or accelerators.

An existing method for backward congestion control management may be understood with reference to FIG. 2. In the system shown in FIG. 2, a source node 220 transmits data packets to a destination node via a switch 210. The packets are transmitted via a virtual lane. When congestion occurs on the virtual lane for a given port, the switch 210 detects the congestion using a threshold comparison. This may involve measuring the volume of packets accumulated in the buffer of the switch and measuring an arrival rate of packet sequence numbers. Further details of packet sequence numbers are provided in commonly assigned U.S. patent application Ser. Nos. 11/847,965 and 11/426,421, herein incorporated by reference.

When congestion is detected by the switch 210, the switch sets an explicit congestion notification (ECN) bit in the header of the appropriate data packet being transmitted downstream towards the destination node 230. Upon receipt of a data packet including an ECN bit on, the destination node 230 sets a backward explicit congestion notification (BECN) bit on in the data packet header and transmits the data packet upstream towards the source node 220. When the source node 220 receives the data packet with the BECN bit on, the injection rate of data packets sent downstream is reduced. The source node 220 maintains a table 225 of inter-packet delays used for injection rate control. Each time a data packet is received at the source node 220 with a BECN on, the source node decrements the injection rate to the next lowest rate in the table, i.e., the source node uses the next longer delay in the table for injection rate control. The table index is decremented based on a timer. Whenever the timer expires without receipt of any additional data packets with BECN bits on, the source data rate is allowed to increase by one increment. Eventually, if no more data packets are received with BECN bit on, the injection rate fully recovers.

One problem with this approach is that the source data rate is only decreased after data packets including the ECN and the BECN have made almost one full round trip through the network. In order to accommodate the resulting travel time delays, the nodes must be designed with sufficiently large buffers. The buffer size, and associated node cost, can become quite large when it is desirable for the network to operate at extended distances (e.g., 10 s of kilometers, which is typical for disaster recovery applications). This type of congestion management places a fundamental limit on the maximum distance that can be achieved in a DCE network. Since DCE networks are not necessarily point-to-point, but may involve numerous hops and switch cascades, long cable distances may accumulate even if the source and destination are not geographically distributed far from each other.

Furthermore, the conventional congestion control approach is essentially a long delay feedback loop. Because it takes so long for the ECN/BECN notifications to reach their destinations, the feedback loop is not able to stay current with the state of the network. In fact, the feedback loop may lag behind other forms of credit based flow controls at the link layer.

For at least these reasons, it is desirable to reduce the response time of a backward congestion control scheme and thereby allow for longer distance links without excessively large buffer credits.

SUMMARY

According to exemplary embodiments, a method, a system, and an apparatus are provided for managing backward network congestion to accelerate resolution of congestion in a Data Center Ethernet (DCE) network. A data packet is received at a node in the network. Congestion of the data packet at the node is detected, and a backward congestion notification signal for the data packet is generated. A packet injection rate is adapted based on at least one of the backward congestion notification signal generated by the node and another backward congestion notification signal.

According to an exemplary embodiment, the data packet is received at the node from a source node. The other backward congestion notification signal is generated by a destination node and transmitted for the data packet to the source node in response to receipt of a congestion notification signal transmitted with the data packet from the other node. The source node adapts the packet injection rate based on the backward congestion signal received first. If one or more backward notification signals are received for the same data packet, duplication of the backward notification signal is detected by comparison of packet sequence numbers (PSNs) included in data headers with the backward notification congestion signals. Duplicate backward congestion notification signals received subsequently for the data packet are ignored.

BRIEF DESCRIPTION OF THE DRAWINGS

Referring to the exemplary drawings, wherein like elements are numbered alike in the several Figures.

DETAILED DESCRIPTION

According to an exemplary embodiment, when a switch or other node in a DCE network detects port congestion, a congestion bit may be toggled on in both the forward and backward propagating data streams. The switch may be modified so that a DCE packet can be inserted in the backward propagating direction, with the same address as the source of the virtual lane causing the congestion. The backward propagating packet may be a copy of the packet that is to be echoed from the destination node back to the source node and may be assigned the same PSN as the forward propagating packet. Due to variable delays encountered by packets traversing the network, it is not clear whether the forward or backward propagating packet will arrive back at the source first. However, the use of PSNs allows packet duplication to be detected. Thus, the packet having a particular PSN that arrives first at the source with its BECN bit set on will adapt the packet injection rate, i.e., initiate throttling down of the packet transmission rate. A packet that arrives subsequently with a BECN bit set on but with the same PSN of the packet that arrived first will be ignored. Thus, multiple packets having the same PSN with the BECN bit set on may be sent back to the source, such that the source is made aware of congestion as fast as possible. The source will just ignore packets having the same PSN as a packet first received, so the source does not become overwhelmed with requests to throttle down the packet transmission rate based on the same packet.

Because of the ability to identify packets in flight, in either direction across other networks, multiple congestion notifications can exist in both directions through the fabric and can resolve themselves at the source node or destination node. According to an exemplary embodiment, both the congestion point (e.g., switch) and the receiving end point (destination node) send a packet with the BECN bit set on.

Figure 1:
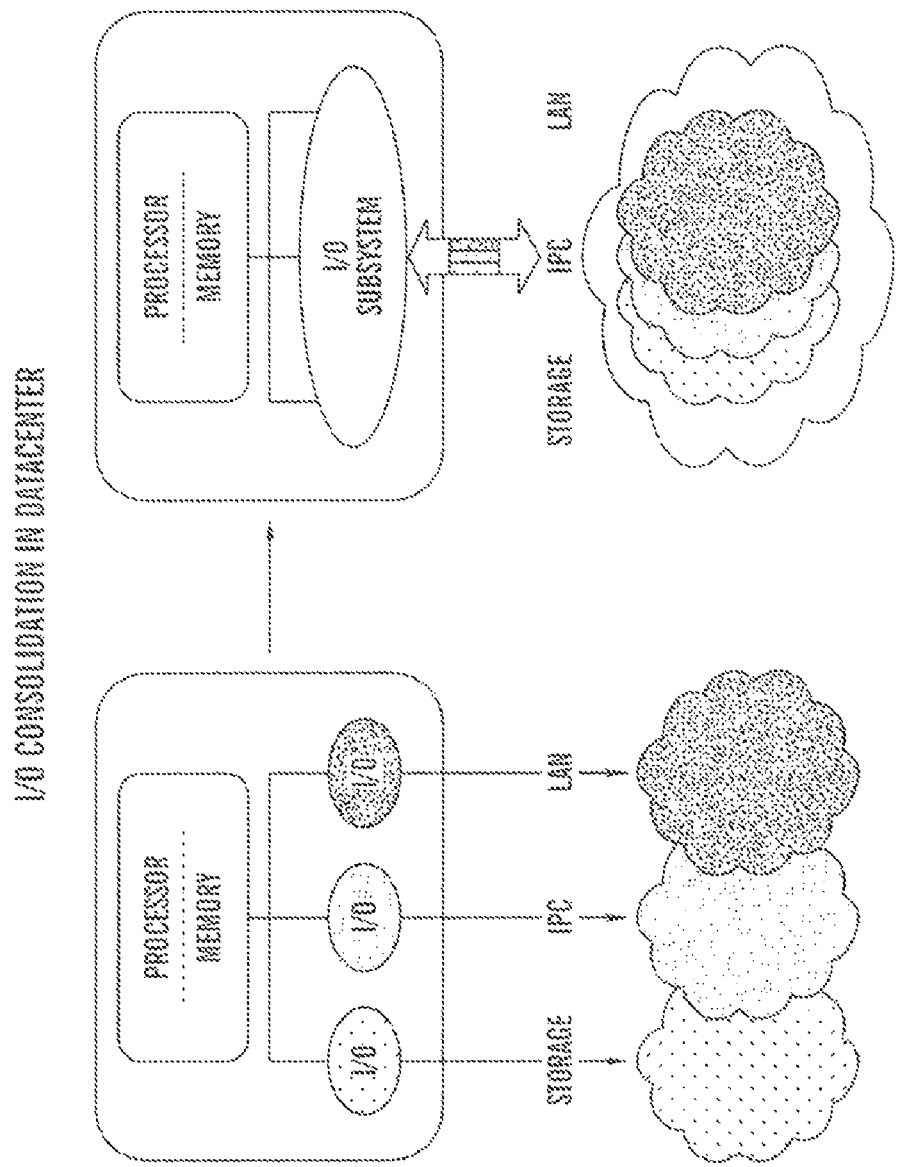
FIG. 1 illustrates proposed consolidation of traffic in a Data Center Ethernet (DCE) network.
Figure 2:
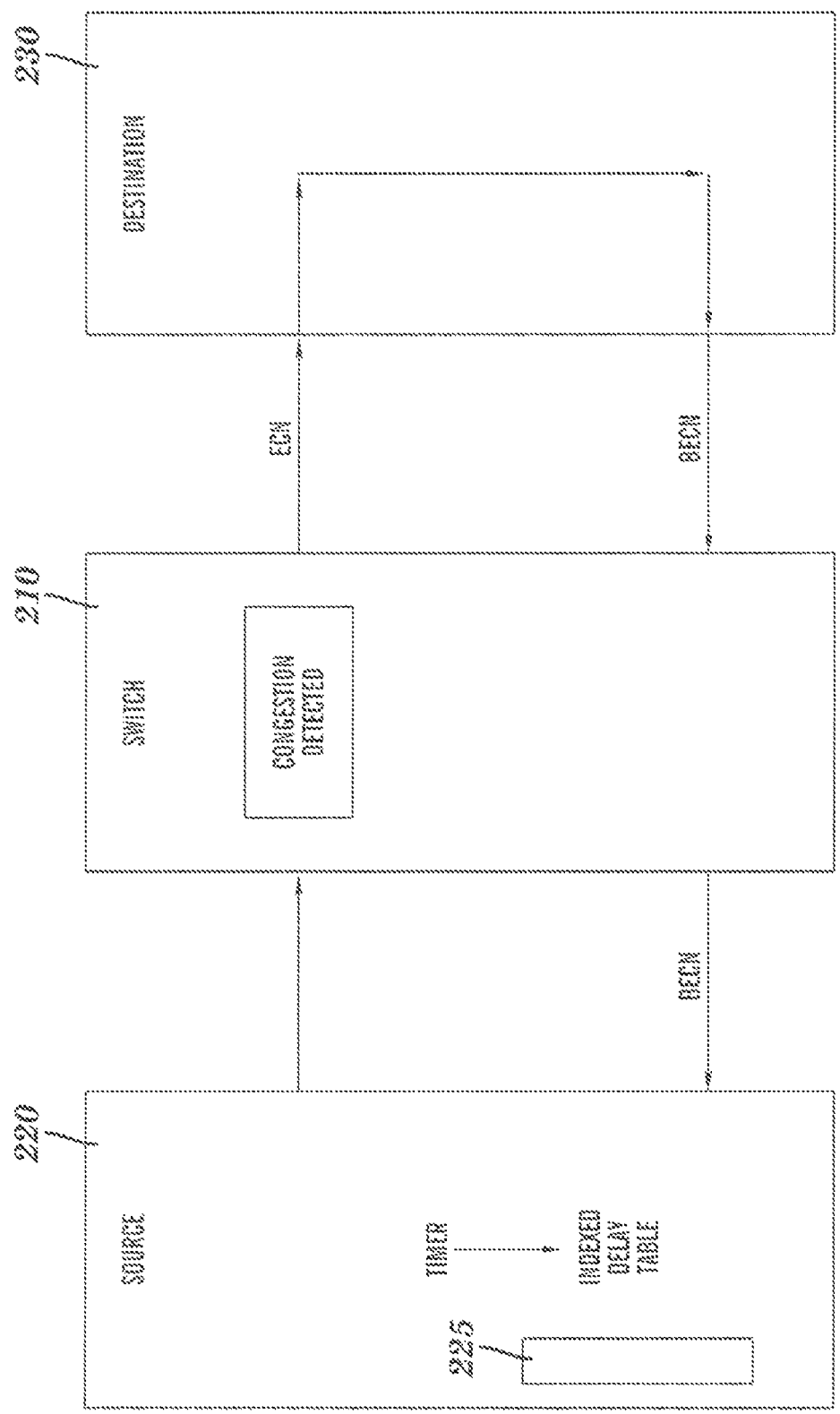
FIG. 2 illustrates how a conventional DCE network resolves congestion.
Figure 3:
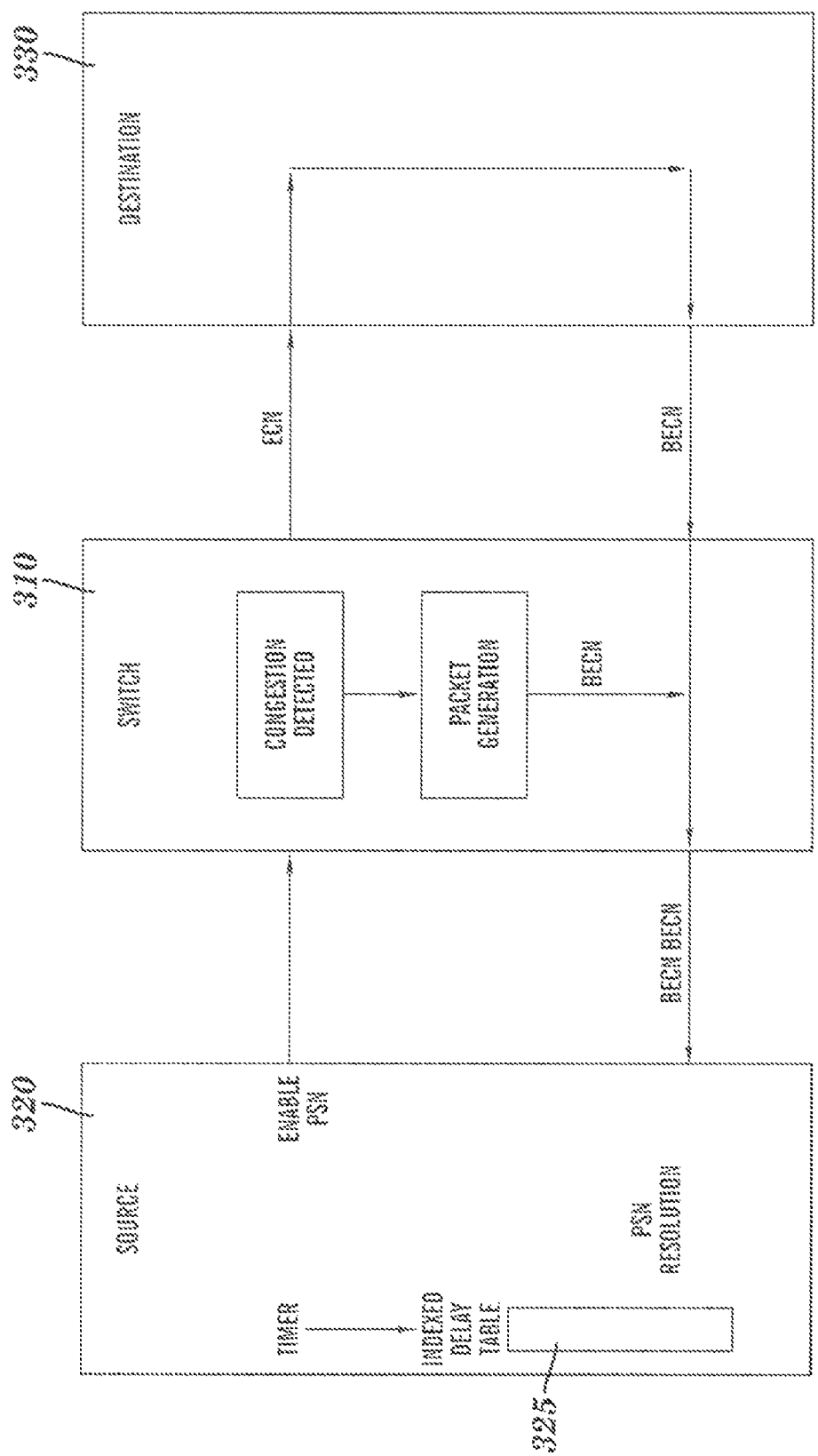
FIG. 3 illustrates how congestion is resolved in a DCE network according to an exemplary embodiment.

FIG. 3 illustrates how congestion is resolved in a DCE network according to an exemplary embodiment. As shown in FIG. 3, a packet with a PSN is sent to a switch 310 from a source node 320. As indicated in FIG. 3, congestion is detected in the switch 310. Congestion may be detected any manner, including that described in commonly assigned, copending U.S. patent application Ser. No. 11/861,564, filed on Sep. 26, 2007, entitled "Method, System, and Computer Program Product for Adaptive Congestion Control on Virtual Lanes for Data Center Ethernet Architecture," and hereby incorporated by reference.

An ECN bit is set on in the header of the data packet sent to the destination node 320, and the destination node responds to the switch 320 with a BECN bit and a PSN identifying the packet. The switch, in turn, transmits the BECN bit and PSN from the destination to the source.

As the switch transmits an ECN bit in the header of the data packet to the destination 330, a packet generator in the switch 310 generates a BECN and a PSN identifying the packet. As those skilled in the art will appreciate, the packet generator may be implemented with customized hardware and/or software, built as desired. The BECN and PSN generated by the packet generator may be formed as a packet header that is substantially a copy of the data packet header sent to the destination node, with a BECN bit set on in the header. The BECN and PSN generated by the switch are sent to the source node 320.

If the source node 320 receives both the BECN generated by the switch and the BECN generated by the destination node 330, the source node 320 reacts to the BECN received first to adapt the packet injection rate, i.e., throttle down the packet transmission rate. If the congested switch is located close to the source node 320, the BECN generated by the switch for a particular packet may be received first. In this case, when the source node 320 receives the BECN for the same packet from the destination node 330, the source node performs a PSN comparison and detects that the BECN bit from the destination node is a duplicate. Thus, the source node ignores the BECN from the destination node. Similarly, if the BECN for a particular packet is received first from the destination node, the BECN for the same packet received from the switch is ignored.

This backward congestion management technique can be significantly faster at throttling down the source data transmission rate compared with prior approaches. The delay between congestion detection and source throttling may be substantially cut compared with prior approaches.

In addition, if one of the BECNs is lost, the source node 320 reacts to the other BECN as soon as it is received. The redundancy in BECN generation provides for fault-tolerant congestion control.

Figure 4:
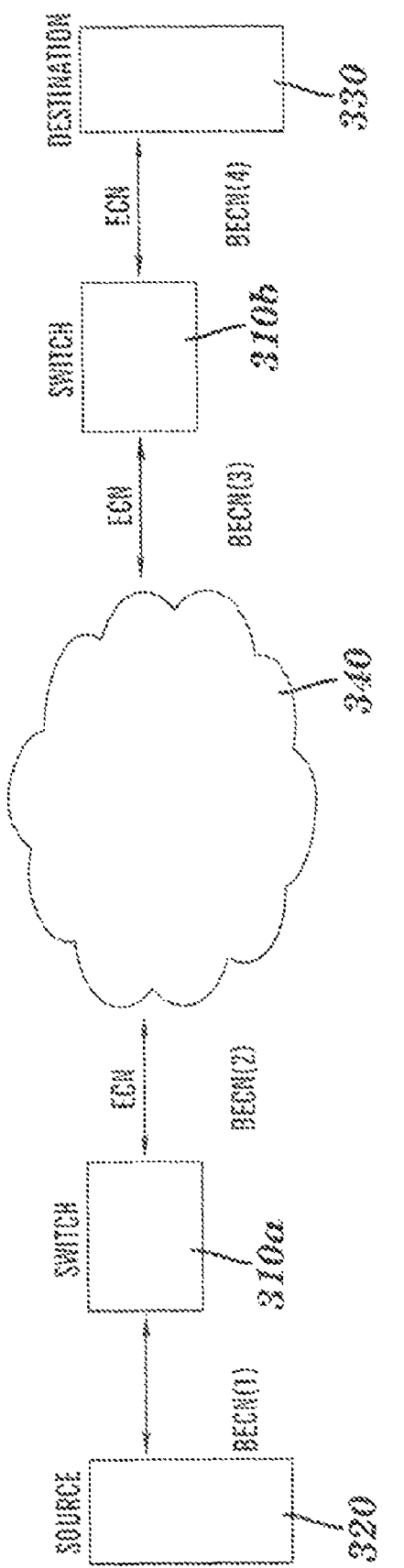
FIG. 4 illustrates the flow of congestion control in a DCE network according to an exemplary embodiment.

FIG. 4 illustrates a flow of congestion control in a DCE network according to an exemplary embodiment. In this embodiment, data packets are transmitted from source node 320 to a destination node 330 via switches 310a and 310b and a DCE fabric of links 340. Although only two switches are shown for simplicity of illustration, it should be appreciated that there may be any number of switches or nodes that may detect congestion. In the example shown in FIG. 4, the switch 310a detects congestion of a data packet, sets an ECN bit on in a data packet header and transmit the data packet with the ECN bit set on to the destination node via the DCE fabric 340 and the switch 310b as explained above. It should be appreciated, however, that congestion may be detected at other places, as well, such as nodes within the fabric 340, at the switch 310b, or at the destination node 330. As the ECNs are received at the fabric 340, the switch 310b, and the destination node 330, each of these components generate a BECN. According to an exemplary embodiment, the data packet header may include, in addition to the BECN, a field that identifies the source of the BECNs, and multiple BECNs may be received by the source node 320. For example, as illustrated in FIG. 4, BECN(1) is a backward congestion bit set on by the switch 310a, BECN(2) is a backward congestion bit set on by a switch or node in the DCE fabric 340, BECN(3) is a backward congestion bit set on by the switch 310b, and BECN(4) is a backward congestion bit set on the by destination node 330. By identifying the source of the BECN, mapping of network behavior is made possible. That is, when the source node 320 receives the BECNs, it can determine the source that transmitted the BECN based on the field identifying the BECN and thus determine at what point(s) congestion is occurring.

As in the system shown in FIG. 3, when the source node 320 receives a BECN for a data packet, the source throttles down packet transmission rate. If the source node 320 determines by PSN comparison that multiple BECNs are received subsequently for the same data packet, the source just ignores the subsequently received BECNs.

Although FIGS. 3 and 4 illustrate congestion detection and BECN generation in switches, it may be desirable to incorporate this architecture into channel extenders of wavelength division multiplexing (WDM) equipment specially designed for use with DCE extended distance links. Since the proposed approach is also fully compatible with legacy backward congestion control, and the two can co-exist in the same network, this backward management congestion control capability may not be needed in every node in a DCE network to obtain benefits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for managing backward congestion in a Data Center Ethernet (DCE) network, comprising:
   receiving a data packet at a node in the network;
   detecting congestion of the data packet at the node in the network;
   generating at least one backward congestion notification signal for the data packet at the node in the network, wherein a packet injection rate is adapted based on at least one of the backward congestion notification signal generated by the node in the network and another backward congestion notification signal;
   wherein the data packet is received at the node in the network from a source node, the another backward congestion notification signal is generated by a destination node and transmitted for the data packet to the source node in response to receipt of a congestion notification signal transmitted with the data packet from the node in the network, and the source node adapts the packet injection rate based on the backward congestion signal received first;
   wherein the congestion notification signal is a data bit included in a data packet header of the data packet transmitted to the destination node, and each backward congestion notification signal is a data bit included in a data packet header transmitted to the source node;
   wherein each data packet header including a backward congestion notification signal also includes a field indicating a source of the backward congestion notification signal.

2. A method for managing backward congestion in a Data Center Ethernet (DCE) network, comprising:
   receiving a data packet at a node in the network;
   detecting congestion of the data packet at the node in the network;
   generating at least one backward congestion notification signal for the data packet at the node in the network, wherein a packet injection rate is adapted based on at least one of the backward congestion notification signal generated by the node in the network and another backward congestion notification signal;
   wherein the data packet is received at the node in the network from a source node, the another backward congestion notification signal is generated by a destination node and transmitted for the data packet to the source node in response to receipt of a congestion notification signal transmitted with the data packet from the node in the network, and the source node adapts the packet injection rate based on the backward congestion signal received first;
   wherein each data packet header includes a packet sequence number (PSN) for that data packet.

3. The method of claim 2, wherein the congestion notification signal is a data bit included in a data packet header of the data packet transmitted to the destination node, and each backward congestion notification signal is a data bit included in a data packet header transmitted to the source node.

4. The method of claim 2, wherein if one or more backward congestion notification signals are received for the same data packet, duplication of the backward congestion notification signal is detected by comparison of the PSNs included in the data headers with the backward congestion notification signals.

5. The method of claim 4, further comprising ignoring a duplicate backward congestion notification signal received subsequently for the data packet.

6. A system for managing backward network congestion in a Data Center Ethernet (DCE) network, comprising:
   a source node for transmitting data packets;
   a destination node for receiving the data packets; and
   at least one node interspersed between the source node and the destination node for receiving a data packet from the source node, detecting congestion of the data packet in the network, generating a congestion notification signal indicating congestion of the data packet, and transmitting the data packet with the congestion notification signal to a destination node in the network;
   wherein the node generates a backward congestion notification signal and transmits the backward congestion notification signal to the source node;
   the destination node receives the congestion notification signal, generates another backward congestion notification signal and transmits the another backward congestion notification signal to the source node; and
   the source node receives at least one of the backward congestion notification signals and adapts a packet injection rate based on the backward congestion notification signal received first;
   wherein the congestion notification signal is a data bit included in a data packet header of the data packet transmitted to the destination node;
   wherein each backward congestion notification signal is a data bit included in a data packet header transmitted to the source node;
   wherein the data packet header including the backward congestion notification signal also includes a field indicating a source of the backward congestion notification signal.

7. A system for managing backward network congestion in a Data Center Ethernet (DCE) network, comprising:
   a source node for transmitting data packets;
   a destination node for receiving the data packets; and
   at least one node interspersed between the source node and the destination node for receiving data packet from the source node, detecting congestion of the data packet in the network, generating a congestion notification signal indicating congestion of the data packet, and transmitting the data packet with the congestion notification signal to a destination node in the network;
   wherein the node generates a backward congestion notification signal and transmits the backward congestion notification signal to the source node;
   the destination node receives the congestion notification signal, generates another backward congestion notification signal and transmits the another backward congestion notification signal to the source node; and the source node receives at least one of the backward congestion notification signals and adapts a packet injection rate based on the backward congestion notification signal received first;

wherein each data packet header includes a packet sequence number (PSN) for that data packet.

8. The system of claim 7, wherein the congestion notification signal is a data bit included in a data packet header of the data packet transmitted to the destination node.

9. The system of claim 7, wherein each backward congestion notification signal is a data bit included in a data packet header transmitted to the source node.

10. The system of claim 7, wherein if the source node subsequently receives one or more backward congestion notification signals for the same data packet, the source node detects duplication of the backward congestion notification signal by comparison of the PSNs included in the data headers with the backward congestion notification signals.

11. The system claim 10, wherein the source node ignores a duplicate backward congestion notification signal received subsequently for the data packet at the source node.

12. An apparatus for managing backward network congestion in a Data Center Ethernet (DCE) network, comprising:
 an input for receiving a data packet;
 a detector for detecting congestion of the data packet;
 a packet generator for generating a backward congestion notification signal for the data packet, wherein a packet injection rate is adapted based on at least one of the backward congestion notification signal generated by the packet generator and another backward congestion notification signal;
 an output for transmitting a congestion notification signal with the data packet to a destination node; and
 another output for transmitting the backward congestion notification signal for the data packet to a source node, wherein the another backward congestion notification signal is generated by the destination node and transmitted for the data packet to the source node in response to receipt of the congestion notification signal, and the source node adapts the packet injection rate based on the backward congestion notification signal received first;
 wherein the congestion notification signal is a data bit included in a header of the data packet transmitted to the destination node, and each backward congestion notification signal is a data bit included in a header of a data packet transmitted to the source node;
 wherein each data packet header including a backward congestion notification signal also includes a field indicating a source of the backward congestion notification signal.

13. An apparatus for managing backward network congestion in a Data Center Ethernet (DCE) network, comprising:
 an input for receiving a data packet;
 a detector for detecting congestion of the data packet;
 a packet generator for generating a backward congestion notification signal for the data packet, wherein a packet injection rate is adapted based on at least one of the backward congestion notification signal generated by the packet generator and another backward congestion notification signal;
 an output for transmitting a congestion notification signal with the data packet to a destination node; and
 another output for transmitting the backward congestion notification signal for the data packet to a source node, wherein the another backward congestion notification signal is generated by the destination node and transmitted for the data packet to the source node in response to receipt of the congestion notification signal, and the source node adapts the packet injection rate based on the backward congestion notification signal received first;
 wherein each data packet header includes a packet sequence number (PSN) for that data packet.

14. The apparatus of claim 13, wherein the congestion notification signal is a data bit included in a header of the data packet transmitted to the destination node, and each backward congestion notification signal is a data bit included in a header of a data packet transmitted to the source node.

15. The apparatus of claim 13, wherein if one or more backward notification signals are received for the same data packet, duplication of the backward notification signal is detected by comparison of the PSNs included in the data headers with the backward congestion notification signals, and a duplicate backward congestion notification signal received subsequently for the data packet is ignored.

* * * * *